US008713111B2

(12) United States Patent
Kamiyama et al.

(10) Patent No.: US 8,713,111 B2
(45) Date of Patent: *Apr. 29, 2014

(54) PROVIDING A WEB PAGE TO A CLIENT

(75) Inventors: Yoshiroh Kamiyama, Setagaya-ku (JP); Keisuke Nitta, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 808 days.

This patent is subject to a terminal disclaimer.

(21) Appl. No.: 12/614,491

(22) Filed: Nov. 9, 2009

(65) Prior Publication Data

US 2010/0122180 A1 May 13, 2010

(30) Foreign Application Priority Data

Nov. 11, 2008 (JP) ................................ 2008-289087

(51) Int. Cl.
*G06F 15/173* (2006.01)
*H04L 29/06* (2006.01)

(52) U.S. Cl.
CPC ........ *H04L 63/0272* (2013.01); *H04L 63/0428* (2013.01); *H04L 63/062* (2013.01); *H04L 63/0807* (2013.01)
USPC ...................................................... 709/206

(58) Field of Classification Search
CPC ............ H04L 63/0272; H04L 63/0428; H04L 63/062; H04L 63/0807
USPC ...................................................... 709/226
See application file for complete search history.

(56) References Cited

U.S. PATENT DOCUMENTS

| 6,775,687 | B1 * | 8/2004 | Binding et al. ............... 709/203 |
| 2005/0086212 | A1 | 4/2005 | Hughes | |
| 2005/0257214 | A1 * | 11/2005 | Moshir et al. ................. 717/171 |
| 2007/0022155 | A1 * | 1/2007 | Owens et al. ................. 709/202 |
| 2007/0094267 | A1 * | 4/2007 | Good et al. ...................... 707/10 |
| 2007/0192147 | A1 * | 8/2007 | Liew et al. ......................... 705/5 |
| 2008/0104391 | A1 * | 5/2008 | Fukuta et al. ................. 713/153 |
| 2008/0178278 | A1 * | 7/2008 | Grinstein et al. ............... 726/12 |
| 2008/0288543 | A1 * | 11/2008 | Barnett ...................... 707/104.1 |
| 2013/0013672 | A1 * | 1/2013 | Kamiyama et al. ........... 709/203 |

FOREIGN PATENT DOCUMENTS

| JP | 2005182364 | 7/2005 |
| JP | 2007047988 | 2/2007 |
| JP | 2007334842 | 12/2007 |

* cited by examiner

*Primary Examiner* — Benjamin R Bruckart
*Assistant Examiner* — Nicholas Celani
(74) *Attorney, Agent, or Firm* — David A. Dagg

(57) ABSTRACT

To display pieces of data provided by different servers in one page, a providing apparatus provides a page to a client terminal, the page including data retrieved from a server. The providing apparatus includes a) a page return unit for, upon receipt of a page retrieval request from the client terminal, returning a page including code to the client terminal, the code to be executed on the client terminal, the code causing the client terminal to transmit a data transmission instruction to the server, the data transmission instruction instructing the server to transmit the data to the providing apparatus, b) a data reception unit for receiving the data transmitted by the server, the server having received the data transmission instruction from the client terminal, and c) a transfer unit for transferring the data received from the server, to the client terminal.

9 Claims, 12 Drawing Sheets

FIG. 7

```
01: <html>
02: <head>
03:   <title>usecase1 test</title>
04:   <script src="widget/widget.js"></script>
05: </head>
06: <body>
07:   <h1>Internal Mashup Service</h1>
08:   <h2 id="contents"></h2>
09:   <button onclick="getData()">getData</button>
10: </body>
11: </html>
```

FIG. 8

```
01: var internalService = "http://internalservice.com/news";
02: var pushBroker = "http://internalservice.com/pushbroker";
03: var serviceBridge = "http://externalservice.com/servicebridge";
04:
05: function getData() {
06:    callPushBroker();
07:    makeRequest();
08: }
09: function onReceive(evt) {
10:    if(xhr.readyState == 4) {
11:       var data = xhr.responseText;
12:       document.getElementById("contents").innerHTML = decrypt(data);
13:    }
14: }
15: function callPushBroker() {
16:    var scriptTag = document.createElement("SCRIPT");
17:    scriptTag.src = pushBroker+"?bridge="+serviceBridge
18:                   +"&url="+internalService+"&key="+encryptionKey;
19:    scriptTag.type = "text/javascript";
20:    document.getElementsByTagName("HEAD")[0].appendChild(scriptTag);
21: }
22: function makeRequest() {
23:    xhr = new XMLHttpRequest();
24:    xhr.open("GET", bridge+"?url="+internalService, true);
25:    xhr.onreadystatechange = onReceive;
26:    xhr.send(null);
27: }
```

FIG. 9

```
01: public class PushBroker extends HttpServlet {
02:     protected void doGet(HttpServletRequest req, HttpServletResponse resp){
03:        String internalService = req.getParameter("url");
04:        String serviceBridge = req.getParameter("bridge");
05:        String encryptionKey = req.getParameter("key");
06:        String data = HttpClient.get(internalService);
07:        if (encryptionKey != null)
08:            data = encryptData(data, encryptionKey);
09:        HttpClient.post(serviceBridge + "?url=" + internalService, data);
10:     }
11: }
```

FIG. 10

```
01: public class ServiceBridge extends HttpServlet {
02:     static Map postedDataMap = new HashMap();
03:
04:     /**
05:      * Receives data from Push Broker, and store it into the map.
06:      */
07:     protected void doPost(HttpServletRequest request, HttpServletResponse response){
08:         String internalService = req.getParameter("url");
09:         String data = readData(request);
10:         postedDataMap.put(internalService, data);
11:     }
12:
13:     /**
14:      * Returns the posted data to the client.
15:      */
16:     protected void doGet(HttpServletRequest request, HttpServletResponse response){
17:         String internalService = req.getParameter("url");
18:         if(waitForData(internalService) == READY){
19:             sendData(postedDataMap.get(internalService));
20:             postedDataMap.remove(internalService); // clear the data
21:         }
22:     }
23: }
```

FIG. 11

```
01: <html>
02: <head>
03: <script>
04: var internalService = "http://internalservice.com/news";
05: var pushBroker = "http://internalservice.com/pushbroker";
06: var serviceBridge = "http://externalservice.com/servicebridge";
07:
08: function generateEncryptionKey(){
09:     ....
10: }
11: function callPushBroker() {
12:     var scriptTag = document.createElement("SCRIPT");
13:     scriptTag.src = pushBroker+"?bridge="+serviceBridge
14:                     +"&url="+internalService+"&key="+encryptionKey;
15:     scriptTag.type = "text/javascript";
16:     document.getElementsByTagName("HEAD")[0].appendChild(scriptTag);
17: }
18: function redirectToActualPage() {
19:     location.replace(location.href+"?redirect=1");
20: }
21:
22: generateEncryptionKey();
23: callPushBroker();
24: redirectToActualPage();
25: </script>
26: </head>
27: </html>
```

FIG. 12

```
01: <html>
02: <head>
03: <title>usecase2 test</title>
04: <script>
05: function getEncryptionKey(){
06:    ....
07: }
08: function decrypt(text, key){
09:    ....
10: }
11: function init(){
12:    var key = getEncryptionKey();
13:    var elem = document.getElementById("contents");
14:    elem.innerHTML = decrypt(elem.innerHTML, key);
15: }
16: </script>
17: </head>
18: <body onload="init()">
19:    <h1>Internal Mashup Service</h1>
20:    <h2 id="contents">4K8sdf82S2q</h2>
21: </body>
22: </html>
```

PROVIDING A WEB PAGE TO A CLIENT

CROSS REFERENCE TO RELATED APPLICATIONS

The present application claims priority from Japanese Application Number 2008-289087, filed in Japan on Nov. 11, 2008, the contents of which are incorporated herein by reference.

FIELD OF THE INVENTION

The present invention relates to a system and method for providing a Web page to a client system.

BACKGROUND OF THE INVENTION

There is known a mashup service provider that provides a service called "mashup." A mashup service provider incorporates pieces of data specified by a user and provided by different servers into one web page and provides the web page to a client terminal. For example, a mashup service provider previously receives the specification of weather data provided by a server A and the specification of stock price data provided by a server B from a user. Upon receipt of a page retrieval request from the user, the mashup service provider provides a web page including weather data and stock price data to the user. Such a mashup service provider is capable of providing a web page customized for each user.

For example, a user may want to retrieve a web page including data provided by a server on an intranet of a company and data provided by an external server. For example, a user may want to retrieve a web page including a business travel expense application screen provided by a server on an intranet of a company and a route information screen provided by an external server.

However, the server on the intranet of the company is shut off from the outside by a firewall. Therefore, an external, ordinary server cannot access the server on the intranet. As a result, a mashup service provider cannot provide a web page including data provided by the intra-company server and data provided by an external server.

Also, due to the cross-domain problem, a browser is configured so that pieces of data retrieved from multiple servers cannot be displayed in one screen. Therefore, a client cannot create a screen where data retrieved from an external server and data provided by an intra-company server are combined.

Japanese Unexamined Patent Application Publication No. 2007-334842 describes a method by which a client retrieves information about a different domain by creating a script dynamically. However, as for the method described therein, a server returns data in response to not only an access for a mashup purpose but also any type of access from a client. Therefore, this method may be vulnerable in terms of security.

SUMMARY OF THE INVENTION

In order to solve the above-mentioned problem, a first aspect of the present invention provides a providing apparatus for providing a page to a client terminal, the page including data retrieved from a server. The providing apparatus includes: a page return unit for, upon receipt of a page retrieval request from the client terminal, returning a page including code to the client terminal, the code to be executed on the client terminal, the code causing the client terminal to transmit a data transmission instruction to the server, the data transmission instruction instructing the server to transmit the data to the providing apparatus; a data reception unit for receiving the data transmitted by the server, the server having received the data transmission instruction from the client terminal; and a transfer unit for transferring the data received from the server, to the client terminal. Also, the first aspect of the present invention provides a program and a method for causing a computer to function as such a providing apparatus.

The second aspect of the present invention provides a server for providing data to the providing apparatus according to the first aspect of the present invention. The server includes: a transmission instruction reception unit for receiving the data transmission instruction transmitted by the client terminal that has received a page from the providing apparatus, the page including the code; and a data transmission unit for, upon receipt of the data transmission instruction, transmitting the data to the providing apparatus, the data being specified by the data transmission instruction. Also, the second aspect of the present invention provides a program and a method for causing a computer to function as such a server.

A third aspect of the present invention provides a system including the providing apparatus according to the first aspect of the present invention and the server according to the second aspect of the present invention. Note that the above-mentioned outline of the present invention does not list all features essential to the present invention and that subcombinations of the features can also be included in the invention.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

FIG. 7 is an example of pseudocode of an HTML page returned by the providing apparatus 120 that has received a page retrieval request transmitted from a client terminal 130 according to the first example.

FIG. 8 is an example of pseudocode of a script called from the HTML page shown in FIG. 7.

FIG. 9 is an example of pseudocode of a push broker module commonly included in the internal server 114 according to the first example and the internal server 114 according to the second example.

FIG. 10 shows an example of pseudocode of a service bridge module commonly included in the providing apparatus 120 according to the first example and the providing apparatus 120 according to the second example.

FIG. 11 is an example of pseudocode of the first HTML page returned by the providing apparatus 120 that has received a page retrieval request transmitted from the client terminal 130 according to the second example.

FIG. 12 is an example of pseudocode of the second HTML page returned by the providing apparatus 120 that has received a page retrieval request retransmitted by the client terminal 130 according to the second example.

DETAILED DESCRIPTION OF EXEMPLARY EMBODIMENTS

Now, the present invention will be described using an embodiment thereof. However, the embodiment does not limit the invention as set forth in the appended claims. Also, not all combinations of the features described in the embodiment are essential as a means for solving the above-mentioned problem.

Figure 1:
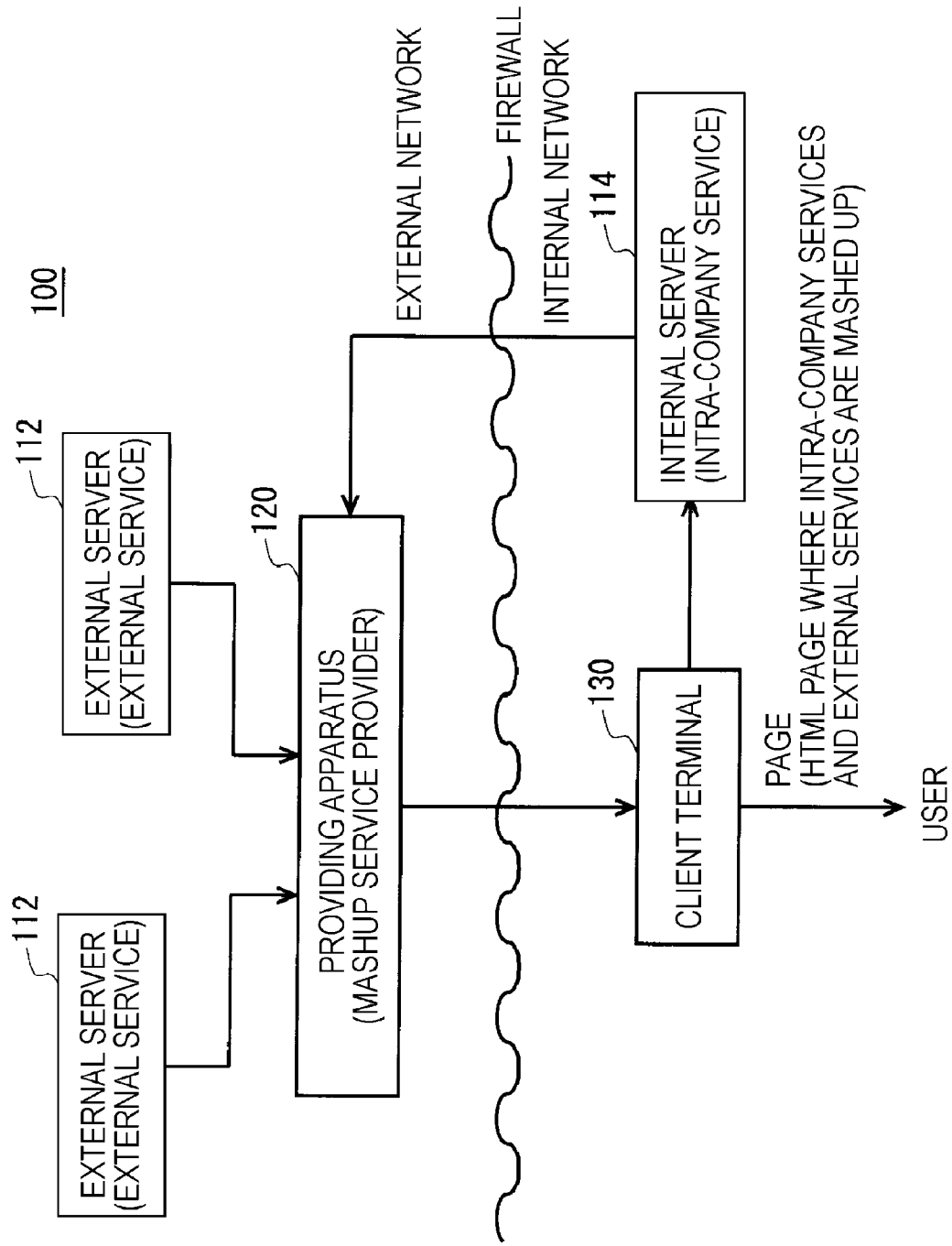
FIG. 1 shows a configuration of an information providing system 100 according to an embodiment of the present invention.

FIG. 1 shows a configuration of an information providing system 100 according to this embodiment. The information providing system 100 includes one or more external servers 112, an internal server 114, a providing apparatus 120, and a client terminal 130.

Each external server 112 and the internal server 114 are examples of a server and provide data in response to a given request. The providing apparatus 120 provides a page including data retrieved from each external server 112 and data retrieved from the internal server 114, to the client terminal 130. The providing apparatus 120 provides, for example, a web page to the client terminal 130 via a network. The client terminal 130 shows the page provided by the providing apparatus 120 to a user.

Each external server 112 and providing apparatus 120 are connected to an external network where these apparatuses are not prevented from exchanging information with each other. "An apparatus is connected to a network" means that the apparatus can communicate with other apparatuses on the network, whether by wire or wirelessly.

On the other hand, the internal server 114 and client terminal 130 are connected to an internal network where an access from an apparatus connected to an external network is interrupted by, for example, a firewall or the like. Therefore, the internal server 114 and client terminal 130 can communicate with each other, while they do not receive an access from an apparatus connected to an external network. Note that the internal server 114 and client terminal 130 can transmit information to an apparatus connected to an external network and can retrieve information from an apparatus connected to an external network.

The providing apparatus 120 according to this embodiment receives, from the user, the specification of one or more servers (external server 112 and internal server 114) that provide pieces of data that the user wants to retrieve. Subsequently, in response to a page retrieval request from the user, the providing apparatus 120 retrieves pieces of data from the specified external server 112 and internal server 114 and provides a page including the retrieved pieces of data to the client terminal 130. For example, the providing apparatus 120 may provide a mashup service. That is, the providing apparatus 120 provides a web page created by mashing up data provided through an external service and data provided through an intra-company service, to the client terminal 130.

Figure 2:
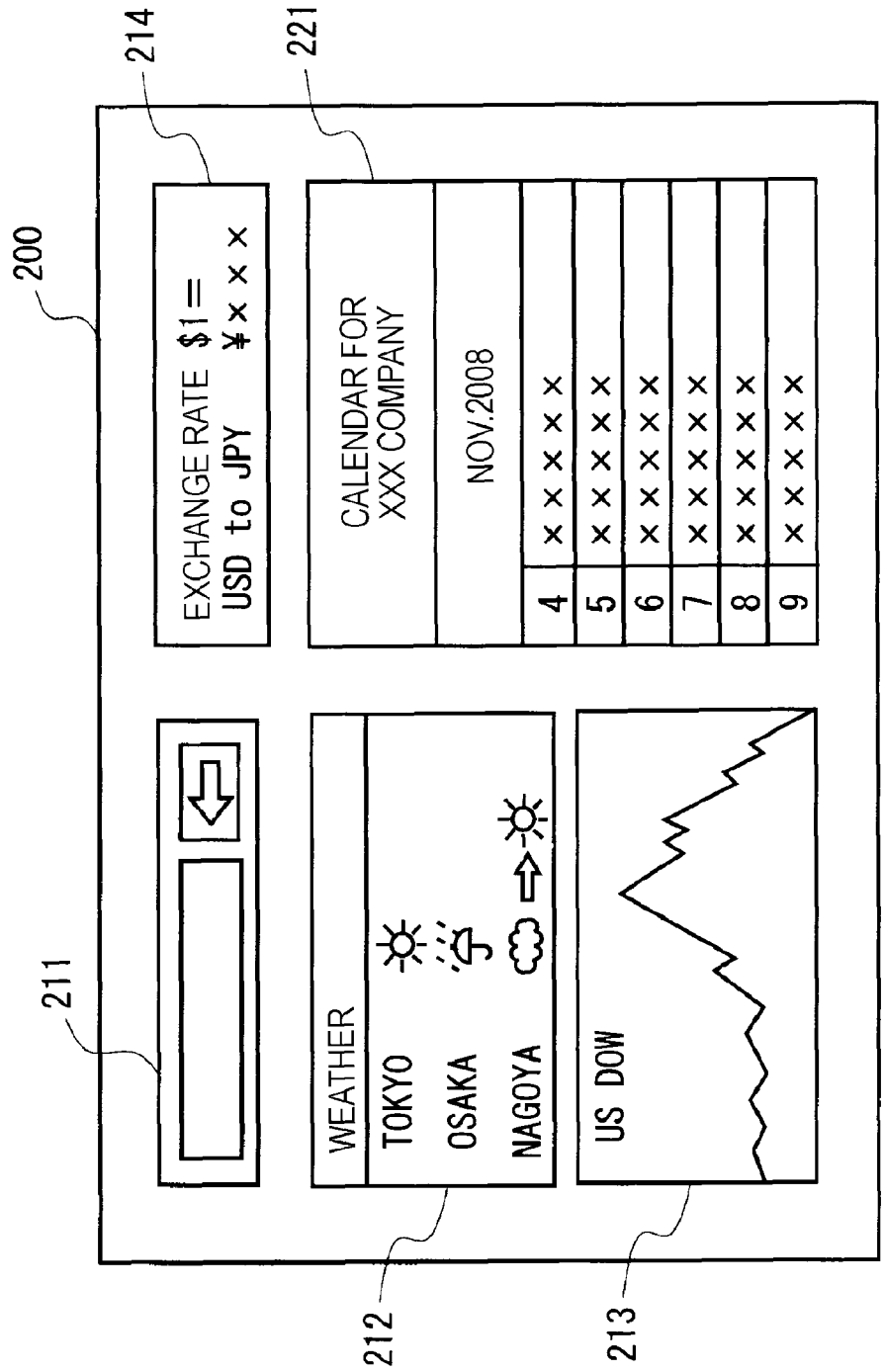
FIG. 2 shows an example of a web page 200 provided by a providing apparatus 120 according to this embodiment.

FIG. 2 shows an example of a web page 200 provided by the providing apparatus 120 according to this embodiment. The providing apparatus 120 may provide, for example, the page 200 as shown in FIG. 2 to the client terminal 130. The web page 200 includes data provided by the external server 112 and data provided by the internal server 114.

Specifically, the web page 200 includes search data 211, weather data 212, stock price data 213, and currency exchange data 214, which are provided by different external servers 112. Also, the web page 200 includes company calendar data 221 provided by the internal server 114.

The providing apparatus 120 previously receives the specification of data to be incorporated into the web page 200 and the specification of the position of each data on the page. Upon receipt of a page retrieval request from the client terminal 130, the providing apparatus 120 provides a page where the specified pieces of data are displayed in the specified positions, to the client terminal 130.

Figure 3:
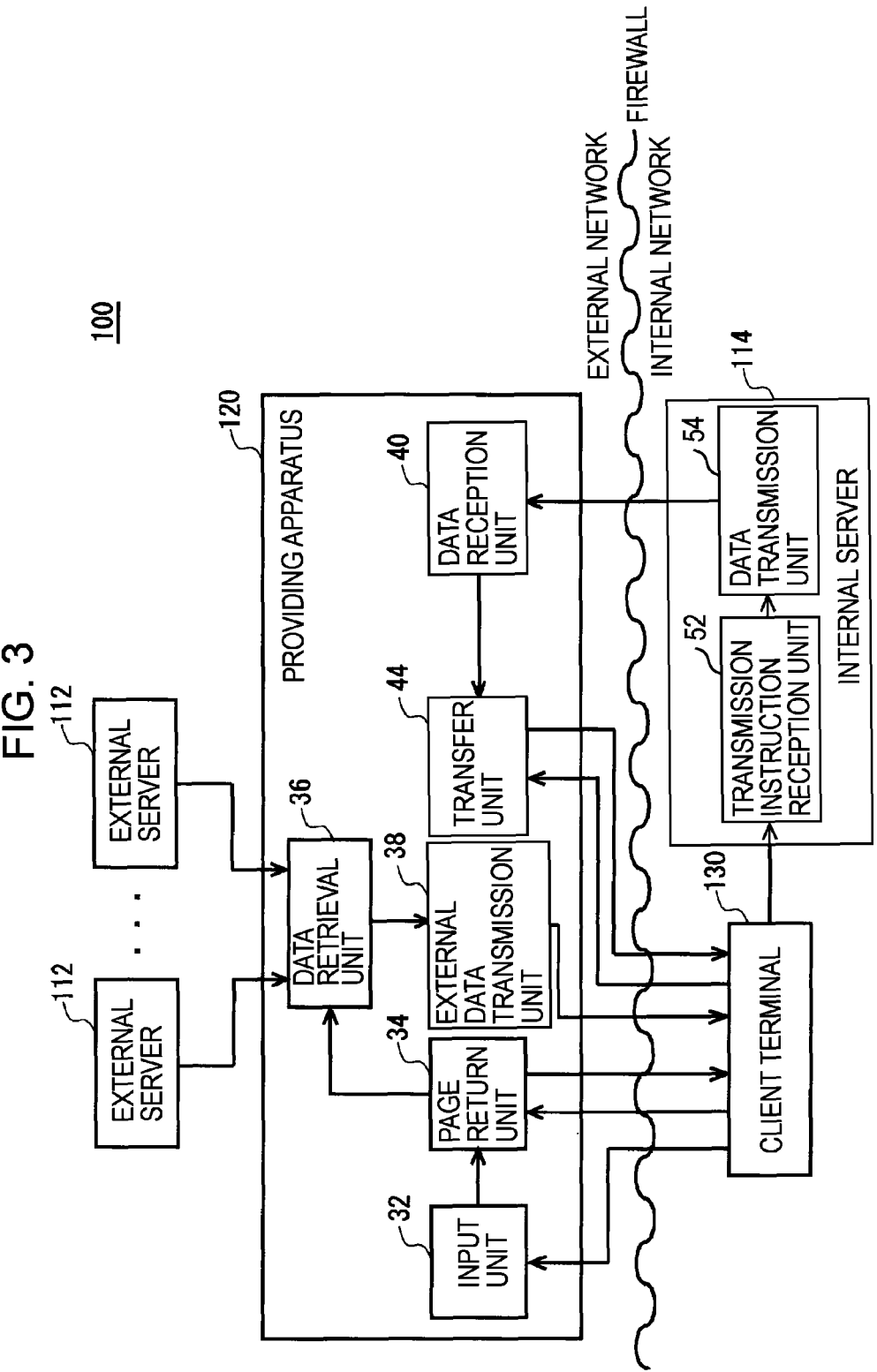
FIG. 3 shows a functional configuration of a providing apparatus 120 and an internal server 114 included in an information providing system 100 according to a first example together with external servers 112 and a client terminal 130.

FIG. 3 shows a functional configuration of a providing apparatus 120 and an internal server 114 included in an information providing system 100 according to a first example together with external servers 112 and a client terminal 130. The providing apparatus 120 according to the first example includes an input unit 32, a page return unit 34, a data retrieval unit 36, an external data transmission unit 38, a data reception unit 40, and a transfer unit 44.

The input unit 32 receives input of the specification of data to be incorporated into a page provided by the providing apparatus 120 from the client terminal 130 before the page is provided. Also, the input unit 32 may receive input of the position of data to be incorporated into the page from the client terminal 130.

Upon receipt of a page retrieval request from the client terminal 130, the page return unit 34 returns a page including code to be executed on the client terminal 130. More specifically, the page return unit 34 returns a page including code that is to be executed on the client terminal 130 and causes the client terminal 130 to transmit, to the internal server 114, a data transmission instruction for instructing the server to transmit specified data to the providing apparatus 120. That is, the page includes code that causes the client terminal 130 to transmit a data transmission instruction to the internal server 114 that, as well as the client terminal 130, is connected to the internal network that interrupts a data retrieval request from the providing apparatus 120.

In this example, the page return unit 34 returns a page including code that causes the client terminal 130 to transmit a data transmission instruction to the internal server 114 as well as causes the client terminal 130 to transmit a data retrieval request to the providing apparatus 120. Also, the page return unit 34 may return, to the client terminal 130, a page including code that is to be executed on the client terminal 130, includes an encryption key of the client terminal 130 as a parameter of the data transmission instruction, and causes the client terminal 130 to load a script on the internal server 114.

Upon receipt of a page retrieval request from the client terminal 130, the data retrieval unit 36 retrieves specified data from the external server 112 connected to the external network that does not interrupt a data retrieval request from the providing apparatus 120. The external data transmission unit 38 transmits data retrieved by the data retrieval unit 36 to the client terminal 130 so that the data is displayed in a page returned by the page return unit 34. Depending on the specification of data to be incorporated into the page, the providing apparatus 120 may be configured so that it retrieves no data from the external server 112.

The data reception unit 40 receives data transmitted by the internal server 114 that has received a data transmission instruction from the client terminal 130. The data reception unit 40 may receive, for example, encrypted data transmitted to the providing apparatus 120 by the internal server 114 that has received a request for retrieval of a script by the client terminal 130.

Upon receipt of a data retrieval request from the client terminal 130, the transfer unit 44 transfers data received from the internal server 114 to the client terminal 130 so that the data is displayed in the page returned by the page return unit 34. The transfer unit 44 may transmit, for example, encrypted data received from the internal server 114 to the client terminal 130.

The internal server 114 includes a transmission instruction reception unit 52 and a data transmission unit 54. The transmission instruction reception unit 52 receives a data transmission instruction transmitted by the client terminal 130 that has received a page including code from the providing apparatus 120. The data transmission unit 54 transmits data specified by the data transmission instruction received by the transmission instruction reception unit 52, to the providing apparatus 120. In this case, the data transmission unit 54 may retrieve data from another server connected to the internal network and transmit the retrieved data to the providing apparatus 120 or may transmit data provided by the internal server 114 itself to the providing apparatus 120.

Figure 4:
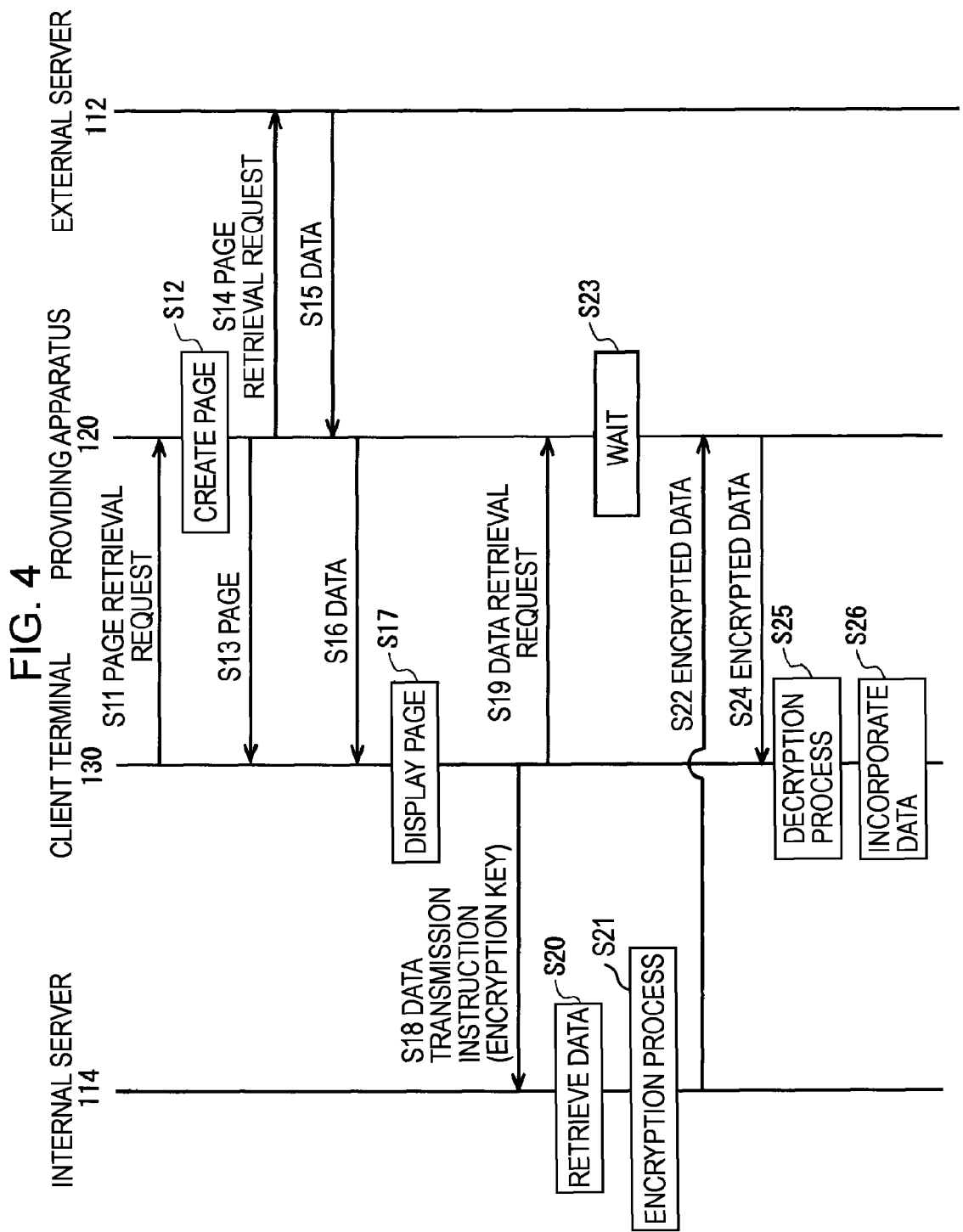
FIG. 4 shows a flow of a page providing process performed in the information providing system 100 according to the first example.

FIG. 4 shows a flow of a page providing process performed in the information providing system 100 according to the first example. First, the client terminal 130 transmits a page retrieval request to the providing apparatus 120 (S11). Upon receipt of the page retrieval request from the client terminal 130, the page return unit 34 of the providing apparatus 120 creates a page (S12). Subsequently, the page return unit 34 returns the created page to the client terminal 130 (S13).

At that time, the page return unit 34 returns a page including code to be executed on the client terminal 130. More specifically, the page return unit 34 returns a page including code for causing the client terminal to transmit, to the internal server 114, a data transmission instruction for instructing the server to transmit specified data to the providing apparatus 120 and code for causing the client terminal 130 to transmit a request for retrieval of specified data to the providing apparatus 120.

The code for causing the client terminal to transmit a data transmission instruction to the internal server 114 causes the client terminal to transmit, to the internal server 114, a data transmission instruction including an encryption key of the client terminal 130 as a parameter. The code for causing the client terminal to transmit a data transmission instruction to the internal server 114 may be code for causing the client terminal to load a script from the internal server 114, such as a script tag. Alternatively, the code for causing the client terminal to transmit a data transmission instruction to the internal server 114 may be code for causing the client terminal to retrieve image data from the internal server 114, such as an image tag.

Subsequently, the data retrieval unit 36 of the providing apparatus 120 transmits a request for retrieval of data to be incorporated into the page, to the external server 112 (S14). Subsequently, the data retrieval unit 36 retrieves data returned by the external server 112 that has received the data transmission request (S15). For example, the data retrieval unit 36 may transmit a request for retrieval of weather data or the like to a specified external server 112 and retrieve data from the external server 112. Subsequently, the external data transmission unit 38 of the providing apparatus 120 transmits the data retrieved by the data retrieval unit 36 to the client terminal 130 (S16).

Subsequently, the client terminal 130 displays the page returned by the providing apparatus 120 that has received the page retrieval request, in such a manner that the data transmitted in step 16 is incorporated into the page (S17). That is, the client terminal 130 displays the page including the data provided by the external server 112.

Subsequently, the client terminal 130 executes code included in the page returned by the providing apparatus 120. That is, the client terminal 130 transmits, to the internal server 114, a data transmission instruction for instructing the server to transmit specified data to the providing apparatus 120 (S18). Also, the client terminal 130 transmits a data retrieval request for retrieval of specified data, to the providing apparatus 120 (S19). Incidentally, the client terminal 130 creates an encryption key before transmitting the data transmission instruction. Subsequently, the client terminal 130 transmits the data transmission instruction including the created encryption key as a parameter of the data transmission instruction, to the internal server 114.

Subsequently, the transmission instruction reception unit 52 of the internal server 114 receives the data transmission instruction transmitted by the client terminal 130. Subsequently, the transmission instruction reception unit 52 retrieves data specified by the received data transmission instruction (S20). The transmission instruction reception unit 52 may retrieve, for example, company calendar data or the like.

Subsequently, the transmission instruction reception unit 52 encrypts the retrieved data using the encryption key included in the data transmission instruction as a parameter (S21). Subsequently, the data transmission unit 54 of the internal server 114 transmits the data encrypted by the transmission instruction reception unit 52 to the providing apparatus 120 (S22).

On the other hand, the transfer unit 44 of the providing apparatus 120 receives a data retrieval request for retrieval of specified data, from the client terminal 130. Subsequently, the transfer unit 44 waits until the preparation for transmission of the specified data is completed (S23).

Subsequently, the data reception unit 40 of the providing apparatus 120 receives the encrypted data transmitted by the internal server 114. Subsequently, the transfer unit 44 of the providing apparatus 120 transmits the data received by the data reception unit 40 to the client terminal 130 (S24).

Subsequently, the client terminal 130 receives the encrypted data transmitted by the providing apparatus 120 and decrypts the encrypted data using the encryption key of the client terminal 130 (S25).

Subsequently, the client terminal 130 incorporates the decrypted data into the displayed page (S26). Thus, the client terminal 130 displays the page including the data provided by the internal server 114.

By adopting the information providing system 100 according to the first example as described above, pieces of data provided by different servers are displayed in one page. That is, by adopting the information providing system 100 according to the first example, data (e.g., weather data) provided by the external server 112 connected to the external network and data (e.g., company calendar data) provided by the internal server 114 connected to the internal network of the company are displayed in one page.

Also, by adopting the information providing system 100 according to the first example, the confidentiality of data (e.g., company calendar data) provided by the internal server 114 is protected since the data provided by the internal server 114 is encrypted using the encryption key of the client terminal 130 and then transmitted to the providing apparatus 120. If there is no need to protect the confidentiality of data provided by the internal server 114, the information providing system 100 may be configured so that data provided by the internal server 114 is not encrypted.

Also, the page return unit 34 of the providing apparatus 120 may be configured so that it returns a page including code for causing the client terminal 130 to retrieve, from the providing apparatus 120, the display contents of a predetermined area of the page and incorporate the retrieved display contents into the page, as well as the code for causing the client terminal 130 to transmit a data transmission instruction to the internal server 114. For example, the page return unit 34 may be configured so that it returns a page including code for causing the client terminal 130 to retrieve display contents from the providing apparatus 120 and display the retrieved display contents in an IFrame (inline frame) formed in the page.

If such a configuration is adopted, the providing apparatus 120 further includes a display contents creation unit for creating the display contents including the encrypted data received from the internal server 114. In this case, upon receipt of a data retrieval request from the client terminal 130, the transfer unit 44 transfers, to the client terminal 130, the display contents that are created by the display contents creation unit and include the data received from the internal server 114. Thus, the display contents are displayed in the page returned by the page return unit 34.

Figure 5:
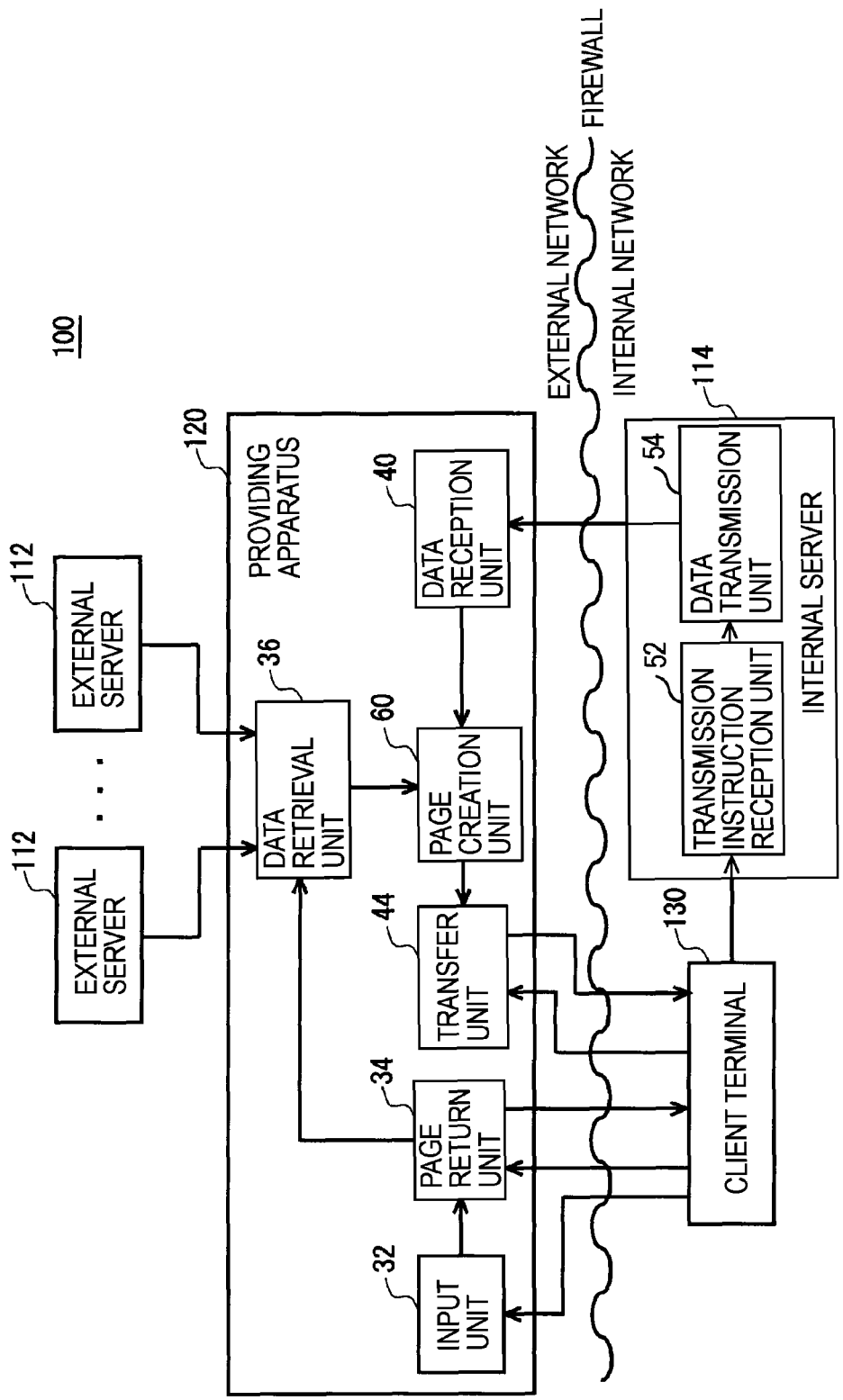
FIG. 5 shows a functional configuration of a providing apparatus 120 and an internal server 114 included in an information providing system 100 according to a second example together with external servers 112 and a client terminal 130.

FIG. 5 shows a functional configuration of a providing apparatus 120 and an internal server 114 included in an information providing system 100 according to a second example together with the external servers 112 and client terminal 130. Since the information providing system 100 according to the second example has a configuration and functions approximately identical to those of the information providing system 100 according to the first example shown in FIG. 3, like elements are assigned like reference numerals and will not be described except for the differences between the information providing system 100 according to the first example and that according to the second example.

The providing apparatus 120 according to the second example includes an input unit 32, a page return unit 34, a data retrieval unit 36, a data reception unit 40, a page creation unit 60, and a transfer unit 44. The page return unit 34 returns a page including code that is to be executed on the client terminal 130 and causes the client terminal 130 to transmit a data transmission instruction to the internal server 114 as well as causes the client terminal 130 to retransmit a page retrieval request to the providing apparatus 120. The code for causing the client terminal 130 to retransmit a page retrieval request may be code for causing the client terminal 130 to retransmit (that is, redirecting) an identical page or may be code for causing the client terminal 130 to retransmit a different page.

The page creation unit 60 creates a page including data retrieved from the external server 112 by the data retrieval unit 36 and encrypted data received from the internal server 114 by the data reception unit 40. If a page retrieval request retransmitted from the client terminal 130 is received, the transfer unit 44 returns a page created by the page creation unit 60.

Figure 6:
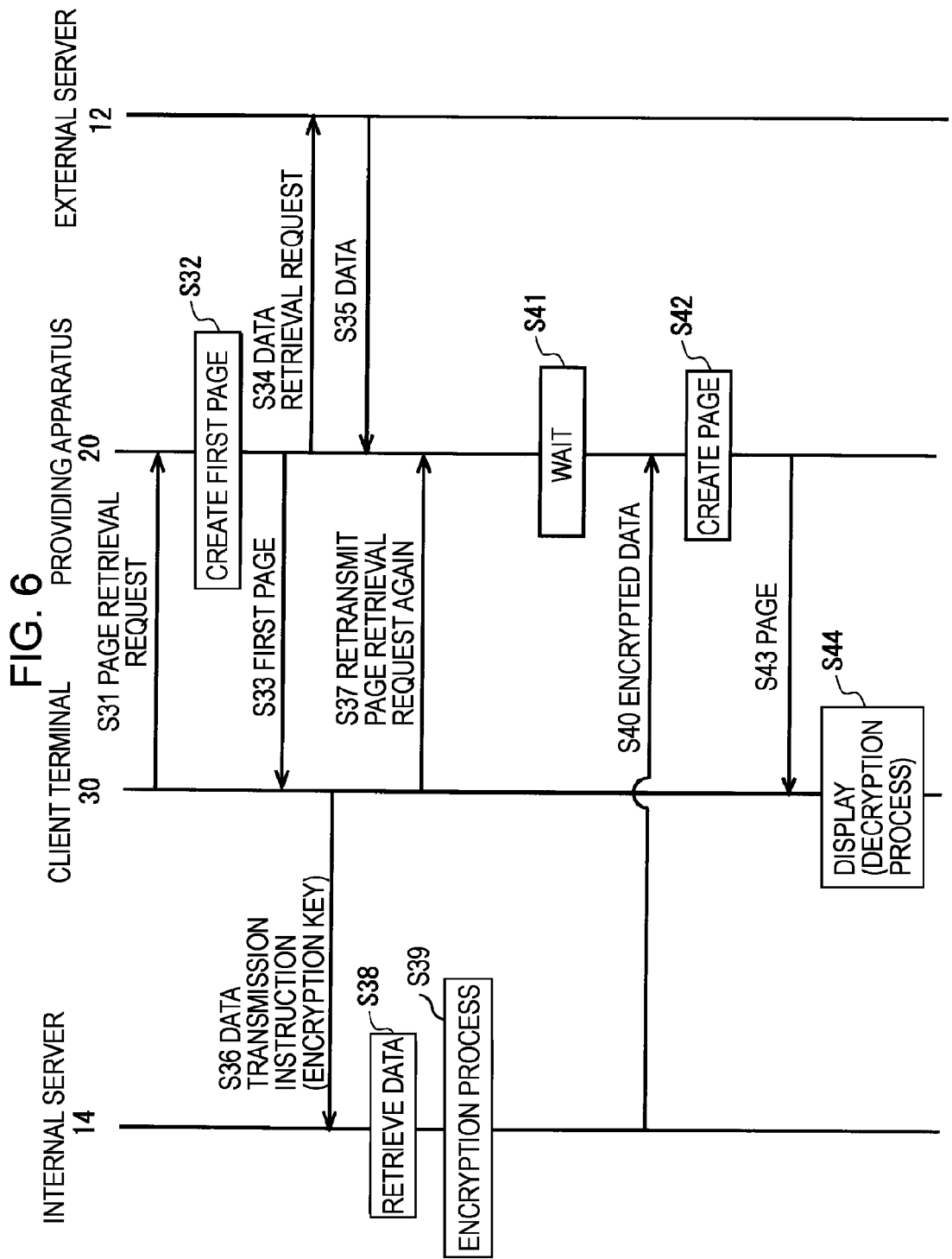
FIG. 6 shows a flow of a page providing process performed in the information providing system 100 according to the second example.

FIG. 6 shows a flow of a page providing process performed in the information providing system 100 according to the second example. First, the client terminal 130 transmits a page retrieval request to the providing apparatus 120 (S31). Upon receipt of the page retrieval request from the client terminal 130, the page return unit 34 of the providing apparatus 120 creates the initial page (S32). Subsequently, the page return unit 34 returns the created initial page to the client terminal 130 (S33).

At that time, the page return unit 34 returns a page including code to be executed on the client terminal 130. More specifically, the page return unit 34 returns the initial page including code for causing the client terminal 130 to transmit, to the internal server 114, a data transmission instruction for instructing the server to transmit specified data to the providing apparatus 120 and code for causing the client terminal 130 to retransmit a page retrieval request to the providing apparatus 120.

Subsequently, the providing apparatus 120 transmits a request for retrieval of data (weather data, etc.) to be incorporated into the page to the external server 112 (S34). Subsequently, the data retrieval unit 36 of the providing apparatus 120 retrieves data returned by the external server 112 that has received the data retrieval request (S35).

Subsequently, the client terminal 130 executes code included in the page returned by the providing apparatus 120. That is, the client terminal 130 transmits, to the internal server 114, a data transmission instruction for instructing the server to transmit specified data to the providing apparatus 120 (S36). Also, the client terminal 130 retransmits a page retrieval request to the providing apparatus 120 (S37). Incidentally, the client terminal 130 creates an encryption key before transmitting the data transmission instruction. Subsequently, the client terminal 130 transmits, to the internal server 114, the data transmission instruction including the encryption key as a parameter of the data transmission instruction.

Subsequently, a transmission instruction reception unit 52 of the internal server 114 receives the data transmission instruction transmitted by the client terminal 130. Subsequently, the transmission instruction reception unit 52 retrieves data (company calendar data, etc.) specified by the received data transmission instruction (S38). Subsequently, the transmission instruction reception unit 52 encrypts the retrieved data using the encryption key included in the data transmission instruction as a parameter (S39). Subsequently, a data transmission unit 54 of the internal server 114 transmits the data encrypted by the transmission instruction reception unit 52 to the providing apparatus 120 (S40).

On the other hand, the transfer unit 44 of the providing apparatus 120 receives the data retrieval request retransmitted by the client terminal 130. Subsequently, the transfer unit 44 waits until the preparation for return of a requested page is completed (S41).

Subsequently, the data reception unit 40 of the providing apparatus 120 receives the encrypted data transmitted by the internal server 114. Subsequently, the page creation unit 60 of the providing apparatus 120 creates a page including data (weather data, etc.) retrieved from the external server 112 by the data retrieval unit 36 in step 35 and data (company calendar data, etc.) retrieved from the internal server 114 by the data reception unit 40 in step 40 (S42). If the data retrieved from the internal server 114 is encrypted, the page creation unit 60 incorporates the encrypted data as it is into the page. The page creation unit 60 may incorporate the encrypted data, for example, as text data, into the page. Subsequently, the transfer unit 44 of the providing apparatus 120 transmits the page created by the page creation unit 60 to the client terminal 130 (S43).

Subsequently, the client terminal 130 receives the page retransmitted by the transfer unit 44 of the providing apparatus 120 as a page corresponding to the retransmitted page retrieval request and displays the page (S44). In this case, the client terminal 130 decrypts the data included in the page and encrypted by the internal server 114 using the encryption key of the client terminal 130 and incorporates the decrypted data into the page again.

By adopting the information providing system 100 according to the second example as described above, an advantage similar to that of the information providing system 100 according to the first example is obtained. That is, by adopting the information providing system 100 according to the second example, pieces of data provided by different servers are displayed in one page. That is, by adopting the information providing system 100 according to the second example, data (e.g., weather data) provided by the external server 112 connected to an external network and data (e.g., company calendar data) provided by the internal server 114 connected to an intranet of a company are displayed in one page.

Also, by adopting the information providing system 100 according to the second example, the confidentiality of data provided by the internal server 114 is protected since the data (e.g., company calendar data) provided by the internal server 114 is encrypted using the encryption key of the client terminal 130 and then transmitted to the providing apparatus 120. If there is no need to protect the confidentiality of data provided by the internal server 114, the information providing system 100 may be configured so that data provided by the internal server 114 is not encrypted.

FIG. 7 is an example of pseudocode of an HTML (hypertext markup language) page returned by the providing apparatus 120 that has received a page retrieval request transmitted by the client terminal 130 according to the first example. FIG. 8 is an example of pseudocode of a script called from the HTML page shown in FIG. 7. If the client terminal 130 according to the first example transmits a page retrieval request to the providing apparatus 120, the pieces of code shown in FIGS. 7 and 8 are returned, and then executed by the client terminal 130 according to the first example.

The code on line 04 of FIG. 7 loads a script shown in FIG. 8. The code on line 08 of FIG. 7 displays data indicating the contents shown in "contents". If a "getData" button is clicked, code on line 09 of FIG. 7 executes a function "getData( )".

The code between line 05 and 08 of FIG. 8 shows the function "getData( )". The function "getData( )" executes the function "callPushBroker( )" and the function "makeRequest( )".

The code between 09 and 14 of FIG. 8 shows the function "on Receive(evt)". The function "on Receive(evt)" stores data received from the providing apparatus 120 in the variable "data", decrypts the data stored in the variable "data", and inserts the decrypted data into an element whose ID attribute has the value "contents" as shown on line 08 of FIG. 7. The data received from the providing apparatus 120 includes encrypted data (e.g., encrypted company calendar data) provided by the internal server 114. Therefore, by executing the function "on Receive(evt)", the client terminal 130 displays the data provided by the internal server 114 in a page.

The code between line 15 and 20 of FIG. 8 shows the function "callPushBroker( )". By executing the function "callPushBroker( )", the client terminal 130 transmits a data transmission instruction to a push broker module of the internal server 114. The push broker module is a module performed in the internal server 114 and realizes the functions of the transmission instruction reception unit 52 and data transmission unit 54 shown in FIGS. 3 and 4. If the client terminal 130 can give a trigger for starting an operation to at least the push broker module, it may be configured so that it cannot actually obtain a script from the push broker module.

The function "callPushBroker( )" transmits a request for retrieval of a script to the push broker module, as well as transmits the address (variable "serviceBridge") of a data reception transfer module (service bridge module) of the providing apparatus 120, the address (variable "internalService") of data provided by the internal server 114, and the encryption key (variable "encryptionKey") of the client terminal 130. In this case, the service bridge module is a module executed in the providing apparatus 120 and realizes the functions of the data reception unit 40 and transfer unit 44 shown in FIG. 3 or the functions of the data reception unit 40, page creation unit 60, and transfer unit 44 shown in FIG. 5. Thus, the internal server 114 that has received the data transmission instruction from the client terminal 130 retrieves the specified data, encrypts the retrieved data, and transmits the encrypted data to the providing apparatus 120.

The code between line 22 and 27 of FIG. 8 shows the function "makeRequest( )". The function "makeRequest( )" calls a library for acquiring specified data from the providing apparatus 120. By executing the function "makeRequest( )", the client terminal 130 transmits a data retrieval request to the providing apparatus 120. The library called by the function "makeRequest( )" is assigned the address (variable "internalService") of data provided by the internal server 114 that has received the data transmission instruction from the client terminal 130. Thus, the providing apparatus 120 that has received the data retrieval request transfers the data transmitted by the internal server 114 that has received the data transmission instruction from the client terminal 130, to the client terminal 130.

FIG. 9 is an example of pseudocode of a push broker module commonly included in the internal server 114 according to the first example and that according to the second example. The code shown in FIG. 9 is called when the client terminal 130 executes the function "callPushBroker( )", and is executed by both the internal server 114 according to the first example and that according to the second example.

The code on line 06 of FIG. 9 retrieves data from an address specified by the function "internalService" and stores the retrieved data in the variable "data". If the variable "encryptionKey" is not null, the code between line 07 and 08 of FIG. 9 encrypts data stored the variable "data" using a encryption key stored in the variable "encryptionKey" and update the variable "data" with the encrypted data.

The code on line 09 of FIG. 9 transmits the variable "data" to a service bridge module that has an address specified by the variable "serviceBridge" and is included in the providing apparatus 120. By executing such code, the internal server 114 retrieves data specified by the client terminal 130, encrypts the retrieved data, and transmits the encrypted data to the providing apparatus 120.

FIG. 10 shows an example of pseudocode of a service bridge module commonly included in the providing apparatus 120 according to the first example and that according to the second example. The code shown in FIG. 10 is executed by both the providing apparatus 120 according to the first example and that according to the second example.

If data transmitted from the internal server 114 is received by the providing apparatus 120, the code between line 07 and 11 of FIG. 10 is called. The code on line 09 of FIG. 10 reads the data transmitted from the internal server 114 and stores the read data into the variable "data". The code on line 10 of FIG. 10 stores the read data in a table (postedDataMap) while identifying the data by an address (variable "internalService") at which the data is provided. By executing such code, the providing apparatus 120 receives data transmitted by the internal server 114 that has received a data transmission instruction from the client terminal 130.

If a data retrieval request transmitted from the client terminal 130 is received by the providing apparatus 120, the code between line 16 and 22 of FIG. 10 is called. The code on line 18 of FIG. 10 waits until data is received from the internal server 114. If data corresponding to the variable "internalService" specified by the data retrieval request transmitted from the client terminal 130 is stored in a table (postedDataMap), the code on line 19 of FIG. 10 transfers the data to the client terminal 130. By executing such code, the providing apparatus 120 transfers data received from the internal server 114 to the client terminal 130 upon receipt of a data retrieval request from the client terminal 130.

FIG. 11 is an example of pseudocode of the first HTML page returned by the providing apparatus 120 that has received a page retrieval request transmitted by the client terminal 130 according to the second example. If the client terminal 130 according to the second example transmits a page retrieval request to the providing apparatus 120, the code shown in FIG. 11 is returned, and executed by the client terminal 130 according to the second example.

The code between line 08 and 10 of FIG. 11 shows the function "generateEncyptionKey( )". The function "generateEncryptionKey( )" creates an encryption key (variable "encryptionKey").

The code between line 11 and 17 of FIG. 11 shows the function "callPushBroker( )". The function "callPushBroker( )" has contents similar to those shown in FIG. 8.

The code between line 18 and 20 of FIG. 11 shows the function "redirectToActualPage( )". The function "redirectToActualPage( )" retrieves an HTML page again by redirecting to the providing apparatus 120. By executing the function "redirectToActualPage( )", the client terminal 130 retransmits a page retrieval request to the providing apparatus 120. The address of a page retrieved by retransmitting a page retrieval request may be identical to that of the first page or may be different from that of the first page.

The code on line 22 of FIG. 11 calls the function "generateEncryptionKey( )". The code on line 23 of FIG. 11 calls the function "callPushBroker( )". The code on line 24 of FIG. 11 calls the function "redirectToActualPage( )". By executing such code, the client terminal 130 transmits a data transmission instruction to the internal server 114, as well as retransmits a page retrieval request to the providing apparatus 120.

FIG. 12 is an example of pseudocode of the second HTML page returned by the providing apparatus 120 that has received a page retrieval request retransmitted by the client terminal 130 according to the second example. If the client terminal 130 according to the second example retransmits a page retrieval request to the providing apparatus 120, the code shown in FIG. 12 is returned, and executed by the client terminal 130 according to the second example.

The code between line 05 and 07 of FIG. 12 shows the function "getEncryptionKey( )". The function "getEncryptionKey( )" retrieves an encryption key created by executing the function "generateEncryptionKey( )" shown in FIG. 11, using some method.

The code between line 08 and 10 of FIG. 12 shows the function "decrypt(text,key)". The function "decrypt(text,key)" decrypts text "text" using an encryption key retrieved by the function "getEncryptionKey( )".

The code on line 20 of FIG. 12 displays data shown in "contents". Encrypted data is incorporated into tags on a page transmitted from the providing apparatus 120.

The code between line 11 and 15 of FIG. 12 shows the function "init( )". The function "init( )" calls the function "decrypt(text,key)" and decrypts the contents of the "contents" and incorporates the decrypted contents into the element. By executing such code, the client terminal 130 decrypts data that is incorporated in the page and encrypted by the internal server 114, using the encryption key of the client terminal 130 and incorporates the decrypted data into the page.

Figure 13:
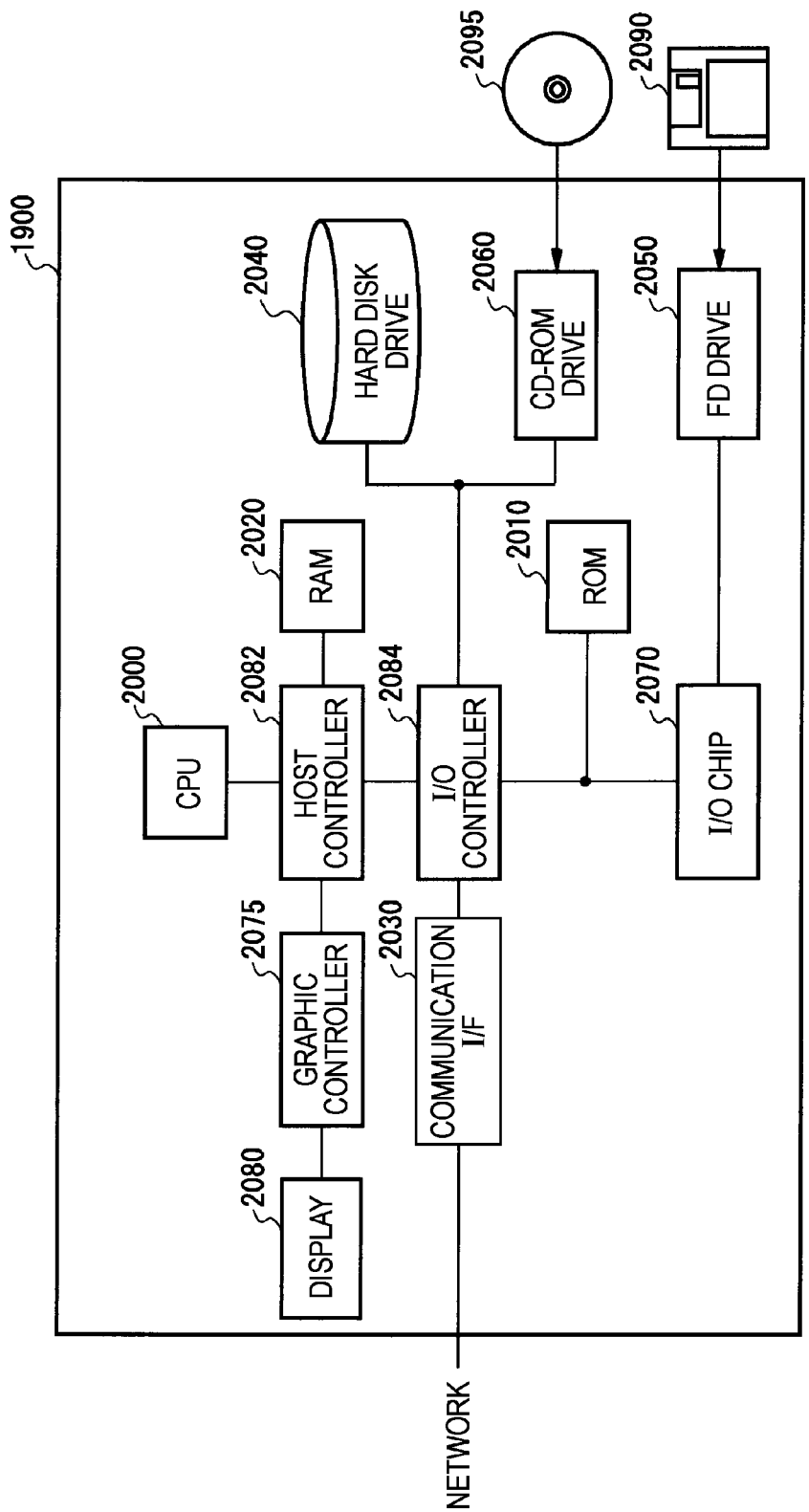
FIG. 13 shows an example hardware configuration of a computer 1900 according to this embodiment.

FIG. 13 shows an example hardware configuration of a computer 1900 according to this embodiment. The computer 1900 according to this embodiment includes a CPU peripheral unit, an input/output unit, and a legacy input/output unit. The CPU peripheral unit includes a CPU 2000, a RAM 2020, a graphic controller 2075, and a display 2080, which are coupled to one another via a host controller 2082. The input/output unit includes a communication interface 2030, a hard disk drive 2040, and a CD-ROM drive 2060, which are coupled to the host controller 2082 via an input/output controller 2084. The legacy input/output unit includes a ROM 2010, a flexible disk drive 2050, and an input/output chip 2070, which are coupled to the input/output controller 2084.

The host controller 2082 couples between the RAM 2020, and the CPU 2000 configured to access the RAM 2020 at a high transfer rate and the graphic controller 2075. The CPU 2000 operates on the basis of programs stored in the ROM 2010 and RAM 2020 so as to control each component. The graphic controller 2075 retrieves image data generated by the CPU 2000 or the like on a frame buffer provided in the RAM 2020 and displays the retrieved image data on the display 2080. Alternatively, the graphic controller 2075 may include a frame buffer for storing image data generated by the CPU 2000 or the like.

The input/output controller 2084 couples between the host controller 2082, and the communication interface 2030, which is a relatively high-speed input/output device, hard disk drive 2040, and CD-ROM drive 2060. The communication interface 2030 communicates with other apparatuses via a network. The hard disk drive 2040 stores a program and data to be used by the CPU 2000 of the computer 1900. The CD-ROM drive 2060 reads out a program or data from the CD-ROM 2095 and provides the read-out program or data to the hard disk drive 2040 via the RAM 2020.

Also coupled to the input/output controller 2084 are the ROM 2010, flexible disk drive 2050, and relatively low-speed input/output devices of the input/output chip 2070. The ROM 2010 stores a boot program to be executed when the computer 1900 starts up, and/or a program dependent on the hardware of the computer 1900. The flexible disk drive 2050 reads out a program or data from the flexible disk 2090 and provides the read-out program or data to the hard disk drive 2040 via the RAM 2020. The input/output chip 2070 couples the flexible drive 2050 to the input/output controller 2084, as well as couples various input/output devices to the input/output controller 2084, for example, via a parallel port, a serial port, a keyboard port, a mouse port, and the like.

For example, a program stored in a recoding medium such as the flexible disk 2090, the CD-ROM 2095, or an integrated circuit (IC) card is installed into the hard disk drive 2040 via the RAM 2020 by the user and then executed by the CPU 2000.

A program installed into the computer 1900 and intended to cause the computer 1900 to function as the providing apparatus 120 according to the first example includes an input module, a page return module, a data retrieval module, an external data transmission module, a data reception module, and a transfer module. This program or these modules operates the CPU 2000 and the like in order to cause the computer 1900 to function as the input unit 32, page return unit 34, data retrieval unit 36, external data transmission unit 38, data reception unit 40, and transfer unit 44.

A program installed into the computer 1900 and intended to cause the computer 1900 to function as the providing apparatus 120 according to the second example includes an input module, a page return module, a data retrieval module, a data reception module, a page creation module, and a transfer module. This program or these modules operates the CPU 2000 and the like in order to cause the computer 1900 to function as the input unit 32, page return unit 34, data retrieval unit 36, data reception unit 40, page creation unit 60, and transfer unit 44.

In other words, when information written in this program is read by the computer 1900, the providing apparatus 120 is realized as specific means in which software and the above-mentioned various hardware resources collaborate with each other. Also, by performing operations on information or processing information using these specific means in accordance with the use objective of the computer 1900 according to this embodiment, a unique providing apparatus 120 according to the use objective is constructed.

A program installed into the computer 1900 and intended to cause the computer 1900 to function as the internal server 114 includes a transmission instruction reception module and a data transmission module. This program or these modules operates the CPU 2000 and the like in order to cause the computer 1900 to function as the transmission instruction reception unit 52 and data transmission unit 54.

In other words, when information written in this program is read by the computer 1900, the internal server 114 is realized as specific means in which software and the above-mentioned various hardware resources collaborate with each other. Also, by performing operations on information or processing information using these specific means in accordance with the use objective of the computer 1900 according to this embodiment, a unique internal server 114 according to the use objective is constructed.

For example, if communications are performed between the computer 1900 and an external apparatus or the like, the CPU 2000 executes a communication program loaded in the RAM 2020 and, on the basis of a process written in the communication program, instructs the communication interface 2030 to perform a communication process. Under the control of the CPU 2000, the communication interface 2030 reads out transmission data stored in a transmission buffer area or the like provided in a storage device such as the RAM 2020, hard disk drive 2040, flexible disk 2090, or CD-ROM 2095 and transmits the read-out transmission data to a network, or writes reception data received via a network into a reception buffer area or the like provided in a storage device. As described above, the communication interface 2030 may transmit transmission data to a storage device or receive reception data from a storage device using the DMA (direct memory access) method. Alternatively, the CPU 2000 may read out data from a storage device or the communication interface 2030, which is the transmission source, and may write the read-out data into the communication interface 2030 or a storage device, which is the transmission destination, so as to transfer transmission data or reception data.

Also, the CPU 2000 loads all or necessary ones of files, databases, and the like stored in an external storage device such as the hard disk drive 2040, CD-ROM drive 2060 (CD-ROM 2095), or flexible disk drive 2050 (flexible disk 2090) into the RAM 2020 using DMA transfer or the like and performs various processes on the data loaded in the RAM 2020. Then, the CPU 2000 writes the resultant data back into the external storage device using DMA transfer or the like. In such a process, the RAM 2020 is considered as a device for temporarily retaining the data stored in the external storage device. Therefore, in this embodiment, the RAM 2020, external storage devices, and the like are each referred to as a "memory," a "storage unit," a "storage device," or the like. In this embodiment, various programs and various types of information such as data, tables, and databases are stored in these storage devices and are subjected to information processing. Incidentally, the CPU 2000 may read or write data from or into a cache memory retaining a part of the RAM 2020. In this case, the cache memory also plays a part of the function of the RAM 2020. Therefore, in this embodiment, the cache memory is referred to as the "RAM 2020," a "memory," or a "storage device," except for a case where the cache memory and RAM 2020 or the like are shown independently.

Also, the CPU 2000 performs various processes that are specified by command strings in a program and include various operations, information processing, condition judgment, and retrieval or replacement of information described in this embodiment, on data read out from the RAM 2020 and then writes the resultant data back into the RAM 2020. For example, if the CPU 2000 performs condition judgment, it judges whether each variable shown in this embodiment meets a condition such as a condition that the variable must be larger, smaller, equal to or larger than, equal to or smaller than, or equal to other variables or constants. If the condition is met (or unmet), the condition judgment is branched to a different command string or a sub-routine is called.

Also, the CPU 2000 is allowed to retrieve information included in a file, a database, or the like stored in a storage device. For example, if multiple entries in which the attribute value of a first attribute and that of a second attribute are associated with each other are stored in a storage device, the CPU 2000 retrieves an entry in which the attribute value of the first attribute meets a specified condition, from among the multiple entries and reads out the attribute value of the second attribute stored in the entry. Thus, the CPU 2000 obtains the attribute value of the second attribute associated with the first attribute meeting the specified condition.

The above-mentioned program or modules may be stored in an external recording medium. Among such recording media are the flexible disk 2090 and CD-ROM 2095 as well as an optical recording medium such as a digital versatile disc (DVD) or a compact disc (CD), a magneto-optical recording medium such as a magneto-optical (MO) disk, a tape medium, and a semiconductor memory such as an IC card. Also, a storage device, such as a hard disk or a random access memory (RAM), provided in a server system connected to a dedicated communication network or the Internet may be used as a recording medium and the above-mentioned program stored in such a storage device may be provided to the computer 1900 via a network.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. While the flow of operations may be described using terms such as "first," "then," and the like in the claims, specification, and drawings for convenience sake, the operations do not always need to be performed in that order.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Each embodiment was chosen and described in order to best explain the principles of the invention and the practical application, and to enable others of ordinary skill in the art to understand the invention for various embodiments with various modifications as are suited to the particular use contemplated.

We claim:

1. A system, comprising:
a providing apparatus in an external network, for providing a page to a client terminal in an internal network, the internal network separated from the external network such that data retrieval requests to the internal network form the external network are prevented, the providing apparatus including at least one processor and at least one computer readable memory having program code stored thereon for execution on the processor, the program code including:
a page return unit for, upon receipt of a page retrieval request from the client terminal, returning a page including code to the client terminal, the code to be executed on the client terminal, the code including a data transmission instruction and an encryption key as a parameter of the data transmission instruction, and, when executed on the client terminal, causing the client terminal to
transmit the data transmission instruction directly to an internal server in the internal network, the data transmission instruction instructing the internal server to transmit specified data out of the internal network to the providing apparatus, and to encrypt the specified data using the encryption key prior to transmitting the specified data to the providing apparatus, and
send a data retrieval request for the specified data to the providing apparatus;
a data reception unit for receiving the encrypted specified data transmitted by the internal server responsive to the internal server having received the data transmission instruction from the client terminal; and
a transfer unit for transferring, responsive to the data retrieval request from the client terminal, the encrypted specified data received from the internal server, to the client terminal for decryption and display in the page.

2. The system according to claim 1, the program code further comprising
a page creation unit for creating a page including the encrypted specified data received from the internal server, wherein
the page return unit causing the client terminal to retransmit the page retrieval request to the providing apparatus, and
upon receipt of the page retrieval request retransmitted from the client terminal, the transfer unit returns the page created by the page creation unit to the client terminal.

3. The system according to claim 1, the program code further comprising:
a data retrieval unit for, upon receipt of the page retrieval request from the client terminal, acquiring data from an external server connected to the external network, the external network not preventing entry of a data retrieval request from the providing apparatus; and
an external data transmission unit for transmitting data retrieved by the data retrieval unit from the external server to the client terminal.

4. The system according to claim 1, the program code further comprising:
an input unit for receiving input of specification of data from the client terminal.

5. The system according to claim 1, wherein
the code to be executed on the client terminal causing the client terminal to load a script on the internal server while serving as the data transmission instruction.

6. The system according to claim 1, wherein
the page return unit returns a page further including second code to the client terminal, the second code to be executed on the client terminal, the second code instructing the client terminal to retrieve display contents of a predetermined area of the page from the providing apparatus and incorporate the retrieved display contents into the page, and the program code further comprising
a display contents creation unit for creating the display contents, the display contents including the data received from the internal server, wherein
upon receipt of a request for retrieval of display contents specified by the second code from the client terminal, the transfer unit returns display contents created by the display contents creation unit to the client terminal.

7. A system comprising:
an internal server, located in an internal network, for providing data; and
a providing apparatus, located in an external network, for providing a page to a client terminal in the internal network, the internal network separated from the external network such that data retrieval requests to the internal network from the external network are prevented, wherein
the providing apparatus includes:
at least one processor and at least one computer readable memory having providing apparatus program code stored thereon for execution on the processor, the providing apparatus program code including
a page return unit for, upon receipt of a page retrieval request from the client terminal, returning a page including code, the code to be executed on the client terminal, the code including a data transmission instruction and an encryption key as a parameter of the data transmission instruction, and, when executed on the client terminal, causing the client terminal to
transmit the data transmission instruction directly to the internal server, the data transmission instruction instructing the internal server to transmit specified data out of the internal network to the providing apparatus, and to encrypt the specified data using the encryption key prior to transmitting the specified data to the providing apparatus, and
send a data retrieval request for the specified data to the providing apparatus;
a data reception unit for receiving the encrypted specified data transmitted by the internal server responsive to the internal server having received the data transmission instruction from the client terminal; and
a transfer unit for transferring, responsive to the data retrieval request from the client terminal, the encrypted specified data received from the internal server, to the client terminal for decryption and display in the page; and
wherein the internal server includes at least one processor and at least one computer readable memory having server program code stored thereon for execution on the processor, the internal server program code including a data transmission unit for, upon receipt of the data transmission instruction from the client terminal, transmitting the encrypted specified data to the providing apparatus.

8. The system of claim 1, further comprising:
an internal server for providing the specified data to the providing apparatus, the internal server comprising at least one processor and at least one computer readable memory having server program code stored thereon for execution on the processor, the server program code including
- a transmission instruction reception unit for receiving the data transmission instruction transmitted by the client terminal that has received the page from the providing apparatus, the page including the code, and
- a data transmission unit for, upon receipt of the data transmission instruction, transmitting the encrypted specified data to the providing apparatus.

9. A computer program product including a non-transitory computer readable storage medium having program code stored thereon for causing a computer to function as a providing apparatus in an external network for providing a page to a client terminal in an internal network, the internal network separated from the external network such that data retrieval requests to the internal network from the external network are prevented, the page including data retrieved from a server, the program code, when executed on a computer causing the computer to function as:

a page return unit for, upon receipt of a page retrieval request from the client terminal, returning a page including code, the code to be executed on the client terminal, the code including a data transmission instruction and an encryption key as a parameter of the data transmission instruction, and, when executed on the client terminal, causing the client terminal to
- transmit the data transmission instruction directly to an internal server in the internal network, the data transmission instruction instructing the internal server to transmit specified data out of the internal network to the providing apparatus, and to encrypt the specified data using the encryption key prior to transmitting the specified data to the providing apparatus, and
- send a data retrieval request for the specified data to the providing apparatus;

a data reception unit for receiving the encrypted specified data transmitted by the internal server responsive to the internal server having received the data transmission instruction from the client terminal; and a transfer unit for transferring, responsive to the data retrieval request from the client terminal, the specified data received from the internal server, to the client terminal for decryption and display in the page.

* * * * *